United States Patent
Tillotson

(10) Patent No.: US 11,124,314 B2
(45) Date of Patent: Sep. 21, 2021

(54) SYSTEMS AND METHODS FOR TRANSFERRING ELECTRIC POWER TO AN AIRCRAFT DURING FLIGHT

(71) Applicant: The Boeing Company, Chicago, IL (US)

(72) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 723 days.

(21) Appl. No.: 15/951,855

(22) Filed: Apr. 12, 2018

(65) Prior Publication Data

US 2019/0315479 A1     Oct. 17, 2019

(51) Int. Cl.
| | |
|---|---|
| *B64D 41/00* | (2006.01) |
| *G06T 7/00* | (2017.01) |
| *H02G 11/02* | (2006.01) |
| *G01S 5/02* | (2010.01) |
| *H02J 7/34* | (2006.01) |

(52) U.S. Cl.
CPC ............ *B64D 41/00* (2013.01); *G01S 5/0231* (2013.01); *G06T 7/97* (2017.01); *H02G 11/02* (2013.01); *H02J 7/342* (2020.01); *B64D 2221/00* (2013.01)

(58) Field of Classification Search
CPC .... B64D 41/00; B64D 2221/00; B64D 39/00; H02J 7/342; G06T 7/97; H02G 11/02; G01S 5/0231; Y02T 90/12; Y02T 90/14; Y02T 10/7072; Y02T 10/70; B64C 2201/066; B64C 39/024; B60L 53/36; B60L 53/37; B60L 53/16; B60L 2260/32; B60L 53/57
See application file for complete search history.

(56) References Cited

U.S. PATENT DOCUMENTS

| | | |
|---|---|---|
| 2,653,777 A | 9/1953 | Barkey |
| 4,678,141 A | 7/1987 | Sarrantonio |
| 6,786,455 B1 | 9/2004 | Bartov |
| 6,966,525 B1 * | 11/2005 | Schroeder .............. B64D 39/00 244/135 A |
| 7,900,866 B2 | 3/2011 | Kutzmann et al. |
| 8,118,261 B1 | 2/2012 | Schroeder |
| 8,191,828 B2 | 6/2012 | Lutke et al. |
| 8,398,028 B1 * | 3/2013 | Speer ..................... B64D 39/00 244/135 A |
| 8,459,593 B2 | 6/2013 | Richardson |
| 8,639,395 B2 * | 1/2014 | Hudson ................ H04B 5/0012 701/3 |
| 9,238,414 B2 | 1/2016 | Ryberg et al. |

(Continued)

*Primary Examiner* — Valentina Xavier
(74) *Attorney, Agent, or Firm* — Ostrager Chong Flaherty & Broitman P.C.

(57) ABSTRACT

Systems and methods for transferring electric power to an aircraft during flight. Power transfer to the receiver aircraft is effected by means of a donor aircraft using a wired electrical connection. The method for transferring electric power includes: establishing an electrical connection between a receiver aircraft and a donor aircraft during flight; and transferring electric power from the donor aircraft to the receiver aircraft via the electrical connection. In one embodiment, electric power is transferred by way of a power cable deployed by the donor aircraft, a drogue attached to a trailing end of the power cable, and a probe mounted to the fuselage of the receiver aircraft, The probe and drogue are configured to form an electrical connection when fully engaged.

21 Claims, 12 Drawing Sheets

(56) References Cited

U.S. PATENT DOCUMENTS

| | | |
|---|---|---|
| 9,278,761 B2 | 3/2016 | Black et al. |
| 9,340,299 B2 * | 5/2016 | Yates ............... B64D 27/24 |
| 9,412,279 B2 | 8/2016 | Kantor et al. |
| 9,551,989 B2 | 1/2017 | Scarlatti et al. |
| 9,643,507 B2 | 5/2017 | Scarlatti et al. |
| 9,650,138 B2 * | 5/2017 | Yates ............... B64D 39/00 |
| 10,153,589 B2 * | 12/2018 | Widegren ......... H01R 13/08 |
| 2008/0054124 A1 | 3/2008 | Takacs et al. |
| 2010/0213318 A1 * | 8/2010 | Hudson ............ B64D 39/00 244/135 A |
| 2010/0276537 A1 * | 11/2010 | Kutzmann ........ B64D 5/00 244/1 TD |
| 2013/0082137 A1 * | 4/2013 | Gundlach ......... B64F 1/0299 244/110 C |
| 2015/0336677 A1 * | 11/2015 | Smaoui ............ B64C 39/02 320/109 |
| 2016/0325834 A1 * | 11/2016 | Foster .............. B64C 27/20 |
| 2016/0355261 A1 * | 12/2016 | Chin ................ B64C 39/024 |
| 2017/0261975 A1 * | 9/2017 | Liu .................. H04B 10/116 |

* cited by examiner

SYSTEMS AND METHODS FOR TRANSFERRING ELECTRIC POWER TO AN AIRCRAFT DURING FLIGHT

BACKGROUND

This disclosure generally relates to the transfer of electric power to an aircraft during flight. In particular, this disclosure relates to systems and methods for transferring electric power to an aircraft for the purpose of battery recharging.

In order to extend the flight range of certain fuel-consuming aircraft, some aircraft have been designed with in-flight refueling or air-to-air refueling capabilities. One type of refueling system includes a hose and drogue system carried by a tanker aircraft and a probe extending forward from a fuel-receiver aircraft that is flying behind the tanker aircraft. The hose and drogue system includes a refueling hose having a drogue disposed at one end. The drogue in such systems is usually a funnel-shaped device attached to the end of a refueling hose for connecting with the probe of the aircraft to be refueled in flight. The refueling hose connects to a hose drum unit that is mounted to the fuselage of the tanker aircraft. When placed in an air stream, the drogue acts to draw the hose out of the aircraft and stabilize the flight of the hose when extended. When not in use, the refueling hose and drogue is reeled completely into the hose drum unit. During operation, the refueling tanker flies straight and level and extends the refueling hose and drogue, which trails behind and below the refueling tanker under normal aerodynamic forces.

Fuel-consuming aircraft (including piloted airplanes and unmanned aerial vehicles) produce carbon dioxide and noise. To avoid carbon dioxide emissions and reduce noise, it is known to employ electrically propelled aircraft. However, the range and flight duration of electrically propelled aircraft are heavily limited by the energy density of batteries. To achieve the same range and duration as a fuel-consuming aircraft, an electrically propelled aircraft would need to carry very large batteries if the batteries were only charged at the start of flight. A way to improve the range and duration of electrically propelled aircraft is to recharge the battery during flight, e.g., by transferring electrical energy from another aircraft.

Accordingly, it would be advantageous to provide improved systems and methods for transferring electric power to an aircraft during flight.

SUMMARY

The subject matter disclosed in some detail below is directed to systems and methods for transferring electric power from a leading aircraft (hereinafter "donor aircraft") to a trailing aircraft (hereinafter "receiver aircraft") during flight. Power transfer from the donor aircraft to the receiver aircraft is effected by means of a wired electrical connection that is established and maintained as the aircraft fly at the same speed along parallel flight paths or the same flight path. The receiver aircraft may be a piloted airplane or an unmanned aerial vehicle. The propulsion system of the receiver aircraft may include electric motors powered by batteries or fuel-consuming engines. Similarly, the donor aircraft may be a piloted airplane or an unmanned aerial vehicle. The propulsion system of the donor aircraft may include electric motors or fuel-consuming engines.

In accordance with some embodiments, the donor aircraft is equipped with a power supply (e.g., an alternating- or direct-current power supply)), a power cable electrically coupled to the power supply and a drogue attached to the end of the power cable, while the receiver aircraft is equipped with a battery recharging system and a probe mounted to a probe support pipe (e.g., a spar, boom or beam) that extends forward from the nose of the aircraft. The probe and drogue are configured to engage each other in a manner that establishes a wired electrical connection. The probe and probe support pipe are configured to carry current from the drogue to the battery recharging system. The battery recharging system includes a battery charger which uses direct current to recharge the batteries onboard the receiver aircraft.

Although various embodiments of systems and methods for transferring electric power to an aircraft during flight are described in some detail later herein, one or more of those embodiments may be characterized by one or more of the following aspects.

One aspect of the subject matter disclosed in detail below is a system for transferring electric power, comprising: a receiver aircraft comprising a first fuselage and a first coupling device externally mounted to the first fuselage, wherein the first coupling device comprises first and second electrical contacts and first and second electrical conductors respectively connected to the first and second electrical contacts; and a donor aircraft comprising a second fuselage and a second coupling device positioned aft of the second fuselage, wherein the second coupling device comprises third and fourth electrical contacts and third and fourth electrical conductors respectively connected to the third and fourth electrical contacts. The first and second electrical contacts are respectively in contact with the third and fourth electrical contacts when the first and second coupling devices are coupled together. The donor aircraft further comprises a power supply and the receiver aircraft further comprises a battery and a battery charger configured to recharge the battery with electric power supplied by the power supply onboard the donor aircraft when the first and second coupling devices are coupled together.

In accordance with some embodiments of the system described in the preceding paragraph, the first coupling device is a probe and the second coupling device is a drogue. In accordance with other embodiments, the first coupling device is a hook and the second coupling device is a trapeze bar.

Another aspect of the subject matter disclosed in detail below is a method for transferring electric power comprising: establishing an electrical connection between a receiver aircraft and a donor aircraft during flight; and transferring electric power from the donor aircraft to the receiver aircraft via the electrical connection. In accordance with some embodiments, establishing an electrical connection comprises: deploying a drogue by unwinding a power cable wound on a power cable spool carried by the donor aircraft; navigating the receiver aircraft to a position where a probe mounted to the receiver aircraft is inserted into the drogue; and clamping the probe to the drogue; whereas transferring electric power comprises: transferring electric power from the donor aircraft to the drogue via the power cable; transferring electric power from the drogue to the probe via electrical contacts; and transferring electric power from the probe to a battery charger onboard the receiver aircraft.

A further aspect of the subject matter disclosed in detail below is an aircraft comprising a fuselage, a coupling device externally mounted to the fuselage and comprising electrical contacts, a battery charger disposed inside the fuselage, and an electrical connection between the battery charger and the electrical contacts in the probe.

Yet another aspect of the subject matter disclosed in detail below is an aircraft comprising a fuselage, a cable spool rotatably coupled to the fuselage, a power supply, a power transfer unit configured to transfer electric power from the power supply in a power transfer mode, a power cable connected to the cable spool and electrically coupled to the power transfer unit, and a drogue attached to the power cable, wherein the power cable comprises electrical conductors and the drogue comprises electrical contacts which are electrically coupled to the electrical conductors of the power cable.

A further aspect is an aircraft comprising a fuselage, a trapeze bar disposed outside the fuselage, a power supply, a power transfer unit configured to transfer electric power from the power supply in a power transfer mode, and electrical conductors electrically coupled to the power transfer unit, wherein the trapeze bar comprises first and second electrical contacts which are electrically coupled to the electrical conductors and disposed on an external surface of the trapeze bar.

Other aspects of systems and methods for transferring electric power to an aircraft during flight are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, systems and methods for transferring electric power to an aircraft during flight will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
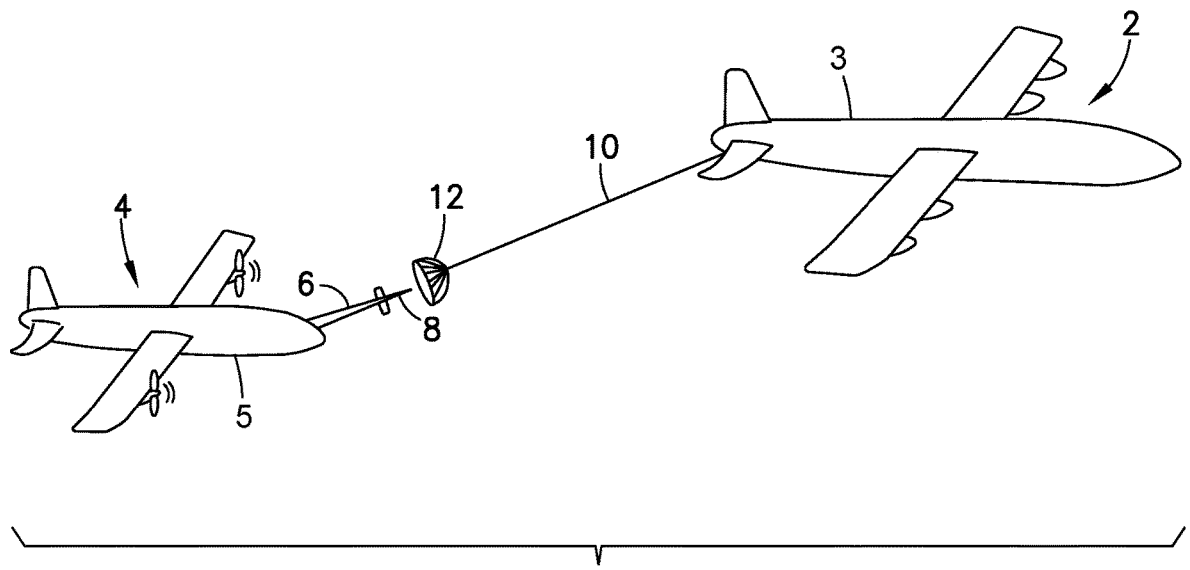
FIG. 1 is a diagram representing a view of a receiver aircraft approaching a drogue which has been deployed behind a donor aircraft in accordance with one embodiment of an aerial electric power transfer system.

FIG. 1 is a diagram representing a view of a receiver aircraft 4 approaching a drogue 12 which has been deployed behind a donor aircraft 2 in accordance with one embodiment of an aerial electric power transfer system. In the scenario depicted in FIG. 1, the donor aircraft 2 and receiver aircraft 4 are flying along parallel flight paths with the donor aircraft 2 leading the receiver aircraft 4. Also the receiver aircraft 4 is flying at a slightly greater speed than the speed of the donor aircraft 2. At the juncture depicted in FIG. 1, the donor aircraft 2 has already deployed a coupling device in the form of a drogue 12, which is attached to the end of a power cable 10. The power cable 10 is connected to a power supply (not shown in FIG. 1) disposed inside the fuselage 3 of the donor aircraft 2. The power supply may be an alternating-current (AC) power supply or a direct-current (DC) power supply. The receiver aircraft 4 includes a fuselage 5, a probe support pipe 6 attached to and extending forward of the fuselage 5, and a coupling device in the form of a probe 8 attached to the end of the probe support pipe 6. The probe 8 and the drogue 12 are configured to interengage to form a wired electrical connection.

Figure 2:
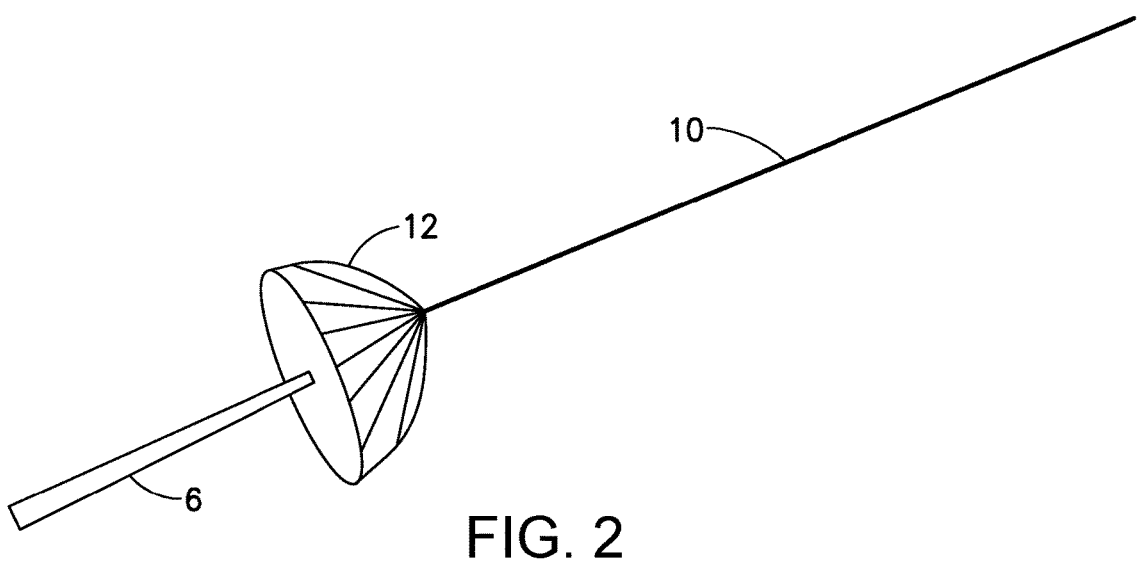
FIG. 2 is a diagram representing a view of a drogue and a probe in a state of engagement that allows electric power to be transferred from a donor aircraft to a receiver aircraft during flight.

FIG. 2 is a diagram representing a view of drogue 12 and a probe 8 (not visible in FIG. 2 because the probe 8 is inside the drogue 12) in a state of engagement that allows electric power to be transferred from the donor aircraft 2 to the receiver aircraft 4 during flight. Electric power is transferred by means of one pair of electrical conductors incorporated in the drogue 12 and power cable 10 and another pair of electrical conductors incorporated in the disposed in the probe 8 and probe support pipe 6. As will be described later in some detail, the pair of electrical conductors incorporated in the drogue 12 may be electrically coupled to the electrical conductors incorporated in the probe 8 when the probe 8 is fully engaged with the drogue 12. In that state of full engagement, one pair of electrical contacts (not shown in FIG. 2) in probe 8 contact another pair of electrical contacts (not shown in FIG. 2) in drogue 12, enabling electrical current to flow between the electrical conductors in drogue 12 and the electrical conductors in probe 8.

To achieve the state of full engagement depicted in FIG. 2, the donor aircraft 2 and receiver aircraft 4 navigate into proximity with each other at a rendezvous location. As will be described in some detail below, this may be accomplished using respective global positioning systems onboard the aircraft and also using a beaconing system that includes a beacon onboard the donor aircraft 2 that transmits beacon signals and a beacon sensor onboard the receiver aircraft 4 that receives beacon signals.

When the donor aircraft 2 and receiver aircraft 4 are in proximity, personnel onboard the donor aircraft 2 deploy the drogue 12. When placed in an air stream, the drogue 12 acts to draw the power cable 10 out of the donor aircraft 2 and stabilize the flight of the power cable 10 when extended. When not in use, the power cable 10 is wound on a cable spool (not shown in FIGS. 1 and 2, but see cable spool 118 in FIG. 9) disposed inside the fuselage 3 of donor aircraft 2 until drogue 12 is inside the fuselage 3. During operation, the donor aircraft 2 flies straight and level and extends the power cable 10 and drogue 12, which trails behind and below the donor aircraft 2 under normal aerodynamic forces. After drogue deployment, the receiver aircraft 4 is maneuvered by the pilot or autopilot to bring the probe 8 into proper position for entering and then engaging with the drogue 12. In accordance with one proposed implementation, the receiver aircraft 4 maneuvers the probe 8 towards the drogue 12 using a beacon sensor (not shown in FIGS. 1 and 2, but see beacon sensor 48 in FIG. 8) configured to allow precise maneuvers relative to beacon signals transmitted by a beacon (not shown in FIGS. 1 and 2, but see beacon 106 in FIG. 9) on the donor aircraft 2 and/or the drogue 12.

When the probe 8 is properly inserted into the drogue 12, pistons (not shown in FIGS. 1 and 2, but see pistons 22a and 22b in FIG. 5) incorporated in the drogue 12 are actuated to clamp the probe 8 in place inside the drogue 12. This clamping operation may be activated automatically by a computer system onboard the donor aircraft 2 or manually by personnel onboard the donor aircraft 2. In the clamped state, the electrical conductors in drogue 12 are electrically coupled to the electrical conductors in probe 8. From this moment on, the pilots or autopilots seek to fly the donor aircraft 2 and receiver aircraft 4 at approximately equal speeds and equal headings in order to maintain a constant spacing between the donor aircraft 2 and receiver aircraft 4 during the power transfer operation. While a constant spacing is being maintained, the personnel onboard the donor aircraft 2 initiate the power transfer operation, causing electric power to be transferred from a power supply (not shown in FIGS. 1 and 2, but see power supply 94 in FIG. 9) onboard the donor aircraft 2 to a battery charger (not shown in FIGS. 1 and 2, but see battery charger 18 in FIG. 7) onboard the receiver aircraft 4 via the electrical connection established by the coupled drogue 12 and probe 8. Upon completion of the electric power transfer operation, the pistons 22a and 22b are withdrawn, thereby releasing the probe 8 from the drogue 12. The pilot or autopilot of the receiver aircraft 4 is then free to maneuver the receiver aircraft 4 away from the donor aircraft 2 and then fly to the next waypoint indicated in the flight plan for the receiver aircraft 4.

Figure 10:
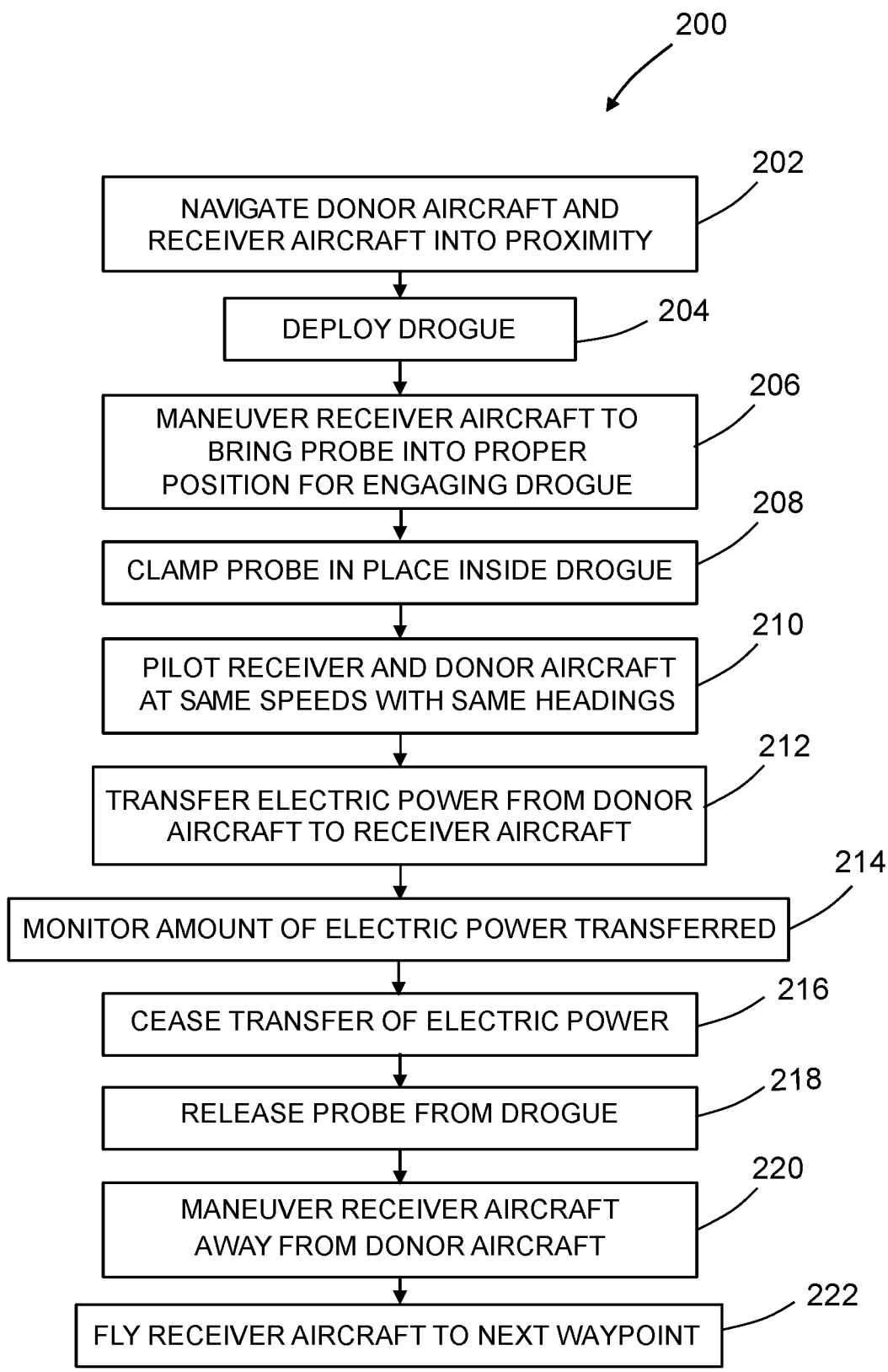
FIG. 10 is a flowchart identifying steps of a method for aerial electric power transfer in accordance with one embodiment.

The foregoing method 200 of aerial electric power transfer is summarized in FIG. 10 as follows: (a) navigate the donor aircraft 2 and receiver aircraft 4 into proximity with each other (step 202); (b) deploy the drogue 12 (step 204); (c) maneuver receiver aircraft 4 to bring the probe 8 into proper position for engaging the drogue 12 (step 206); (d) clamp the probe 8 in place inside the drogue 12 (step 208); (e) pilot the receiving and donor aircraft 2 at the same speeds with the same headings in order to maintain a constant spacing between the aircraft (step 210); (f) transfer electric power from the donor aircraft 2 to the receiver aircraft (step 212); (g) monitor the amount of electric power transferred (step 214); (h) cease the transfer of electric power when a specified threshold has been reached (step 216); (i) release the probe 8 from the drogue 12 (step 218); (j) maneuver the receiver aircraft 4 away from the donor aircraft 2 (step 220); and (k) then fly the receiver aircraft 4 to the next waypoint indicated in the flight plan of the receiver aircraft 4 (step 222).

Each of the donor aircraft 2 and receiver aircraft 4 may be equipped with a respective communication and navigation system by which the two aircraft may rendezvous in flight. As an example, each communication and navigation system may include a respective global positioning system (GPS) to measure the respective locations of the aircraft and a radiofrequency (RF) datalink to enable each aircraft to receive data representing the location of the other aircraft.

In addition, the receiver aircraft 4 may be equipped with a sensing and control system by which the receiver aircraft 4 may locate the drogue 12 and maneuver close enough to enable the probe 8 to be physically coupled to the drogue 12 without damage to either aircraft or the power cable 10. As an example, the sensing and control system may include a system of labels or beacons (e.g., on the donor aircraft 2 and/or on the drogue 12), sensors on the receiver aircraft 4 to detect those labels or beacons, and flight controls to maneuver the receiver aircraft 4 into a position where the probe 8 can engage the drogue 12. Examples of a beacon/sensor combination include: (a) a differential GPS system; or (b) lights on the donor aircraft 2, a camera on the receiver aircraft 4, and a processor connected to the camera and to the flight control system. Sensing and control may also include sensors or mechanisms that sense when the probe 8 is in a proper position inside the drogue 12 and respond by activating an attachment mechanism, such as the pistons 22a and 22b described above.

Figure 7:
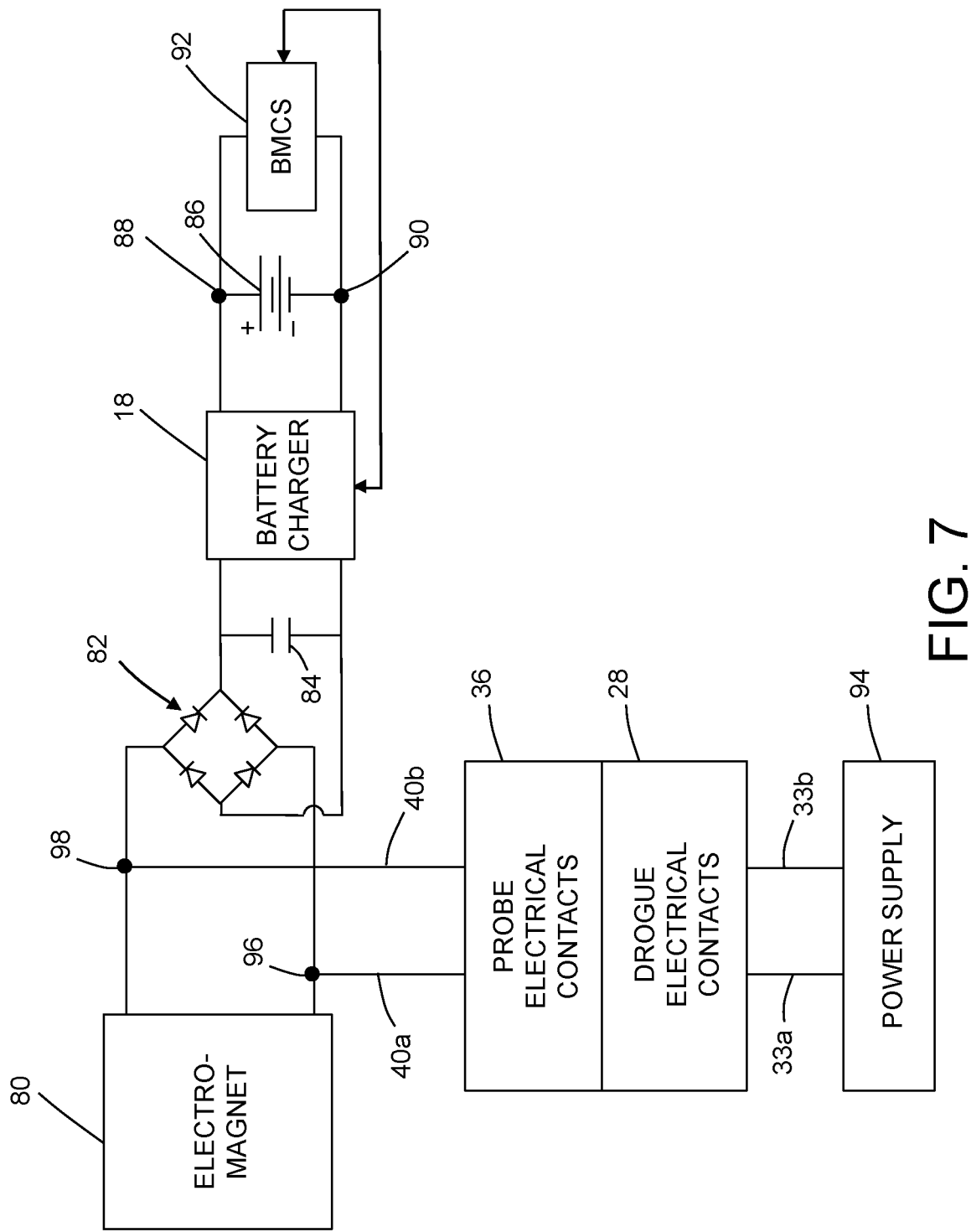
FIG. 7 is a diagram identifying some components of a system for recharging a battery onboard an aircraft during flight in accordance with one embodiment.

In addition, the receiver aircraft 4 may be equipped with a battery charger 18 (see FIG. 7). The battery charger 18 may be configured to change the voltage or regulate the duty cycle of the direct current being supplied to the battery 86 during recharging. Recharging continues until the receiver aircraft 4 has adequately replenished its battery 86. Optionally, the battery recharging system onboard the receiver aircraft 4 includes a battery monitoring and control system (not shown in FIGS. 1 and 2, but see BMCS 92 in FIG. 7). The battery monitoring and control system 92 regulates the flow of current into and out of various cells within the battery 86 to avoid overcharging, overheating, cell imbalance, and other issues.

The embodiment depicted in FIGS. 1 and 2 may employ attachment mechanisms other than pistons. In a simple embodiment, the receiver aircraft 4 has a probe 8 with at least two electrical conductors along its length, at least two electrical contacts (not shown in FIGS. 1 and 2, but see electrical contacts 36a and 36b in FIG. 4) near a tip of the probe 8, and a surface suitable for gripping near the tip of the probe 8. Either as part of the gripping action, or as a later action, electrical contacts (not shown in FIGS. 1 and 2, but see electrical contacts 28a and 28b in FIG. 3) in the drogue 12 move to form an electrical connection with the electrical contacts 36a and 36b on the probe 8. The gripping mechanism exerts enough force to maintain the electrical connection despite minor turbulence and control moves, but is weak enough to release if the receiver aircraft 4 makes an intentional maneuver away from the donor aircraft 2.

Figure 3:
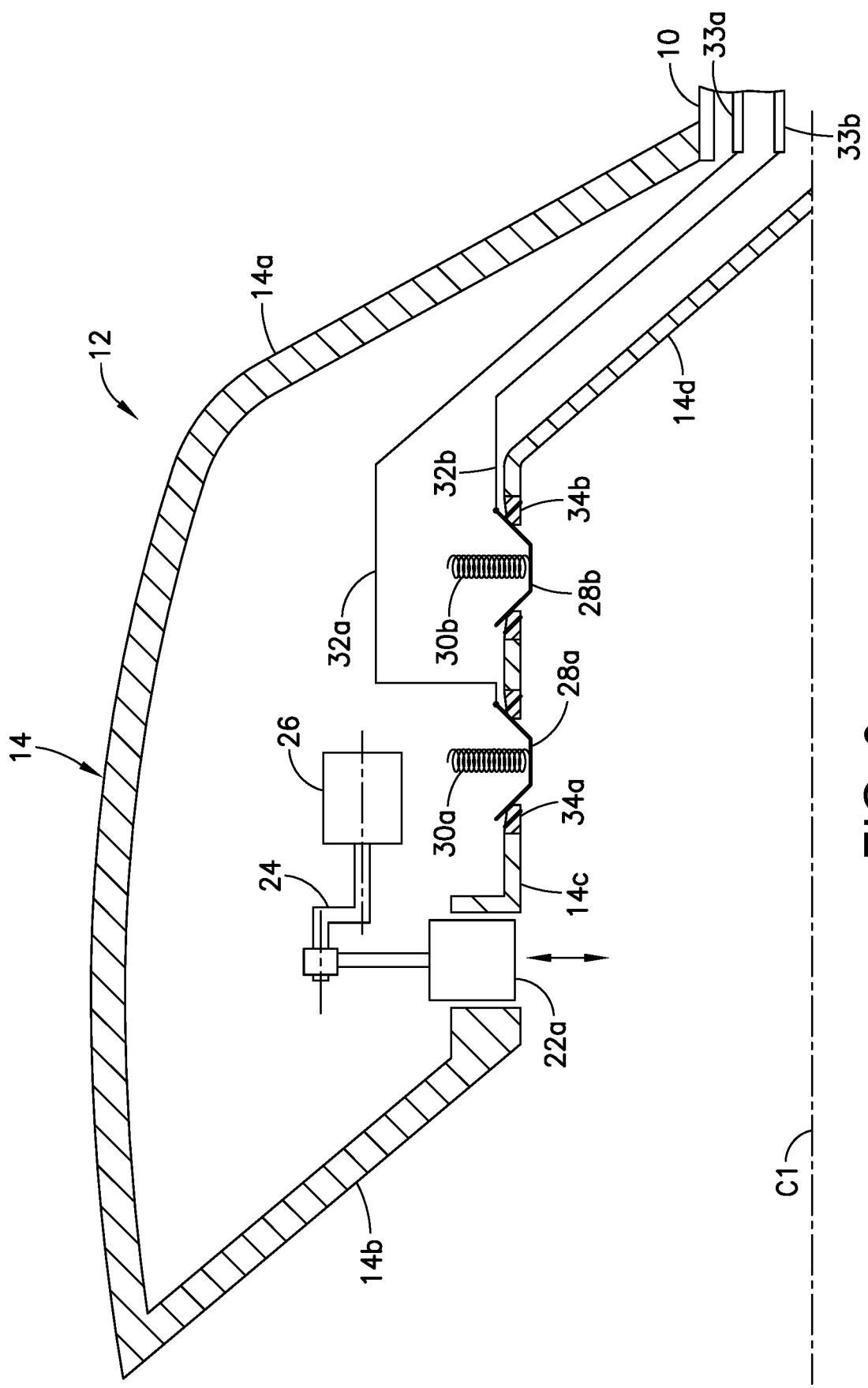
FIG. 3 is a diagram representing a sectional view of half of a drogue through an axis of symmetry in accordance with one embodiment.
Figure 4:
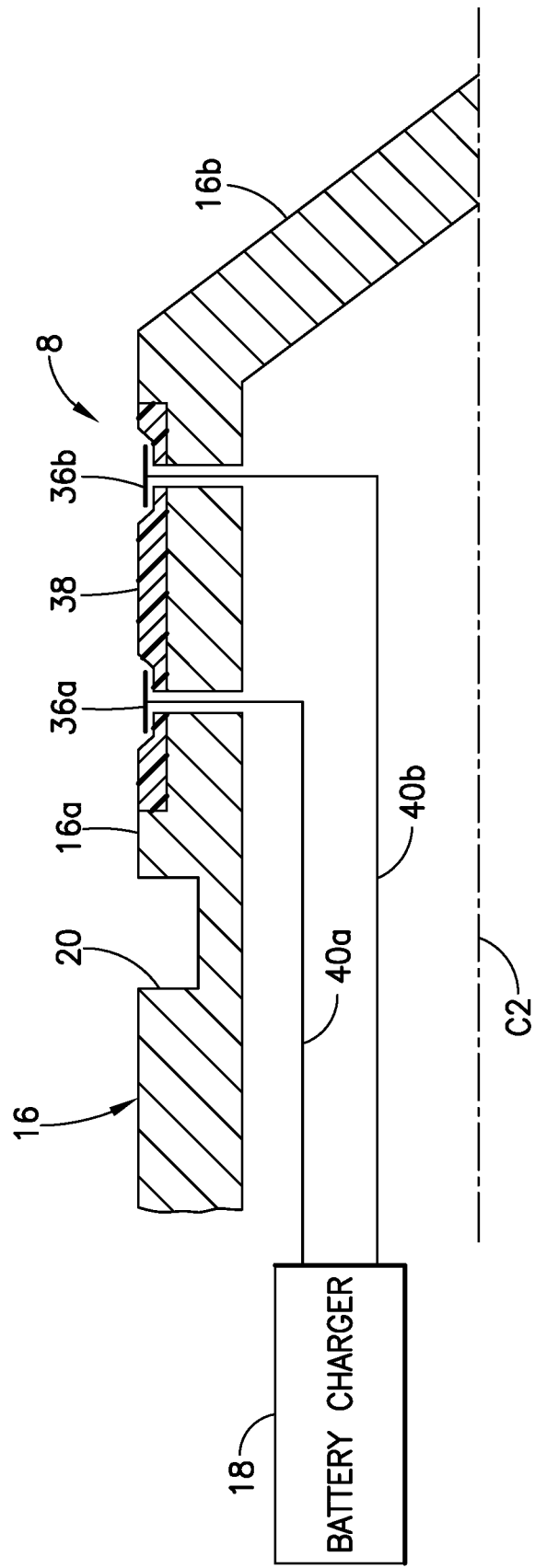
FIG. 4 is a diagram representing a sectional view of half of a probe through an axis of symmetry in accordance with one embodiment.

FIG. 3 is a diagram representing a sectional view of half of a drogue 12 through an axis of symmetry in accordance with one embodiment. FIG. 4 is a diagram representing a sectional view of half of a probe 8 through an axis of symmetry in accordance with the embodiment partly depicted in FIG. 3. The probe 8 and drogue 12 are configured to interengage and then interlock with each other.

Referring to FIG. 3, the drogue 12 includes a drogue housing 14 shaped to provide aerodynamic stability when towed at the end of the power cable 10. At the right side, the drogue housing 14 is attached to the power cable 10 that extends from the donor aircraft 2. The drogue housing 14 includes an aerodynamic surface 14a, a guide surface 14b (at an aft end of the drogue 12), a contact surface 14c and a stop surface 14d. The drogue housing 14 may be made of metal alloy or carbon fiber-reinforced plastic material.

Referring to FIG. 4, the probe 8 includes a probe housing 16 that is attached to the probe support pipe 6 that extends from the receiver aircraft 4. The probe housing 16 includes a contact surface 16a and a guide surface 16b. The probe housing 16 may be made of metal alloy or carbon fiber-reinforced plastic material.

If the probe 8 enters the drogue 12 with the axis of symmetry C2 (see FIG. 4) of the probe 8 out of alignment with the axis of symmetry C1 (see FIG. 3) of the drogue 12, the guide surface 16b of the probe housing 16 will abut and be guided radially inward by the guide surface 14b of the drogue housing 14 until the axes of symmetry C1 and C2 are generally collinear. As the probe 8 continues to travel further into the drogue 12, the guide surface 16b of the probe housing 16 will eventually abut and be stopped by the stop surface 14d of the drogue housing 14. In this position, a pair of motors 26 (only one of which are depicted in FIG. 3) disposed inside drogue housing 14 are activated, which causes the output shafts of the motors 26 to rotate. Although not shown in FIG. 3, the motors 26 receive electric power and control signals from the donor aircraft 2 by way of respective power/signal cords incorporated in the power cable 10. The output shaft of each motor 26 is connected to a respective crank 24. Each crank 24 in turn is connected to a respective one of the pistons 22a and 22b. As the motor 26 drives rotation of the crank 24, the pistons 22a and 22b (see FIG. 3) are displaced radially inward into an annular groove 40 formed in the outer periphery of the probe 8, thereby locking the probe 8 in place. In this position, the probe 8 and rogue 12 become electrically coupled, which state is detected by a probe contact sensor 112 (see FIG. 9).

Referring to FIG. 3, the power cable 10 includes two electrical conductors 33a and 33b that run the entire length of the power cable 10. Within the drogue 12, two electrical conductors 32a and 32b connect the power cable electrical conductors 33a and 33b to two spring-mounted electrical contacts 28a and 28b respectively. The electrical contacts 28a and 28b are urged radially inward by respective springs 30a and 30b. When the probe 8 is fully seated inside the drogue 12 and locked in place (as previously described), the springs 30a and 30b press the electrical contacts 28a and 28b against corresponding electrical contacts 36a and 36b respectively disposed on the outer peripheral surface of the probe 8 (see FIG. 4) to deliver electric power to the battery charger 18 onboard the receiver aircraft 4 via electrical conductors 40a and 40b. In accordance with one proposed implementation, the electrical contacts 28a and 28b (see FIG. 3) incorporated in the drogue 12 are made of electrically conductive material formed into cups having profiles which are truncated cones, whereas the electrical contacts 36a and 36b (see FIG. 4) incorporated in the probe 8 are made of electrically conductive material formed into annular bands.

As seen in FIG. 3, a pair of electrical insulators 34a and 34b with respective openings in which the spring-mounted electrical contacts 34a and 34b are seated keep the spring-mounted electrical contacts 28a and 28b from shorting to the drogue housing 14. As seen in FIG. 4, an annular electrical insulator 38 has a pair of annular grooves in which the electrical contacts 36a and 36b are respectively seated. The electrical contacts 36a and 36b are electrically coupled to the battery charger 18 by way of respective electrical conductors 40a and 40b which extend along the entire length of the probe support pipe 6 (not shown in FIG. 4).

To summarize the embodiment depicted in FIGS. 3 and 4, when the probe 8 partly depicted in FIG. 4 is fully inserted inside and electrically conductively coupled with the drogue 12 partly depicted in FIG. 3, electric power may be transferred from the donor aircraft 2 to the receiver aircraft 4. More specifically, electric power may be transferred from the power supply 94 onboard the donor aircraft 2 to the battery charger 18 onboard the receiver aircraft 4 by way of electrical conductors 33a and 33b in power cable 10, electrical conductors 32a and 32b in drogue 12, electrical contacts 28a and 28b in drogue 12, electrical contacts 36a and 36b in probe 8, and electrical conductors 40a and 40b in probe 8 and probe support pipe 6.

Although not shown in FIG. 3, the drogue 12 may further include a second pair of spring-loaded electrical contacts positioned diametrically opposite to electrical contacts 28a and 28b and electrically connected to electrical conductors 33a and 33b in power cable 10 by a respective pair of electrical conductors similar to electrical conductors 32a and 32b.

Figure 5:
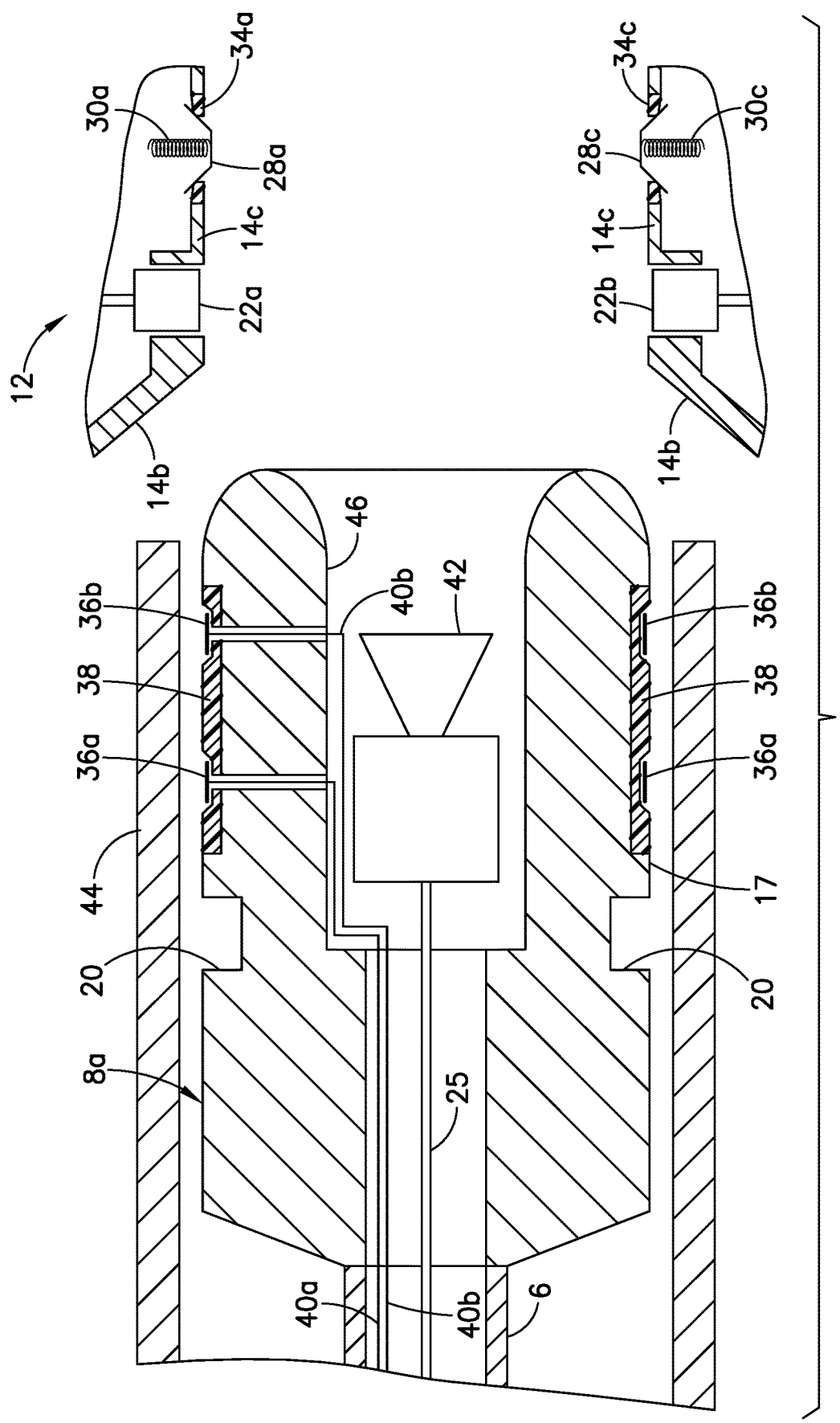
FIG. 5 is a diagram representing a sectional view of a camera-equipped probe as it approaches a drogue of the type depicted in FIG. 3.

For example, FIG. 5 shows a spring-loaded electrical contact 28c diametrically opposed to the spring-loaded electrical contact 28a. The electrical contact 28c is pressed radially inward through an opening in an electrical insulator 34c by a spring 30c. In this case, the electrical contacts 28a and 28c inside the drogue 12 will both contact the annular electrical contact 36a on probe 8 when the probe 8 is fully seated in drogue 12. Similarly, electrical contact 28b and another electrical contact diametrically opposed to electrical contact 28b will both contact the annular electrical contact 36b on probe 8 when the probe 8 is fully seated in drogue 12. Electric power may be transferred concurrently through both electrical connections.

In accordance with some embodiments, sensors are provided for detecting when the probe 8 is fully seated in the drogue 12. For example, this may be accomplished by sensing when electrical connectivity has been established across the electrical contacts. (Other embodiments may use optical or magnetic sensors, for example.) When the sensors report to a computer system onboard the donor aircraft 2 that the probe 8 is fully seated, that computer system will output control signals that activate a clamping mechanism. In accordance with the embodiment depicted in FIGS. 3 and 4, the clamping mechanism includes a pair of motors 26 mechanically coupled to a pair of pistons 22a and 22b (see FIG. 5), which pistons 22a and 22b interlock with the annular groove 20 formed in the outer peripheral surface of the probe 8 (see FIG. 4) when the pistons 22a and 22b are extended radially inward. The control signals from the computer system are sent to a pair of motor controllers (not shown in the drawings) which respectively control operation of the motors 26. In an alternative embodiment, the probe 8 may have a clamping mechanism to grasp the drogue 12. Other embodiments may use a magnetic gripper or a spring-driven piston with gripping force weak enough to release automatically when the receiver aircraft 4 pulls away, etc.

FIG. 5 shows one example of a sensor to assist the probe's approach and insertion into the drogue 12. In this example, the sensor is a video camera 42 which is placed in a cavity 46 of the housing 17 of a probe 8a. The field of view of the video camera 42 being directed forward along the axis of symmetry of the probe 8a. A computer system (not shown in FIG. 5, but see computer system 62 in FIGS. 6 and 8) or a human operator onboard the receiver aircraft 4 uses imagery from the video camera 42 to adjust pitch and yaw as the receiver aircraft 4 approaches the drogue 12. To accommodate aerial electric power transfer at night, optionally the drogue 12 may be provided with a known pattern of optical targets (e.g., retroreflective markers) and the probe 8a may be provided with illuminators which emit light toward those optical targets. The light returned from the optical targets produces spots in the acquired images. The computer system 62 may be programmed with object recognition software that is configured to detect the edges of those spots and calculate the location (e.g., position and orientation) of the drogue 12 relative to the probe 8a based on the pixel locations of the spots in the acquired images. In alternative embodiments, the computer system 62 may be programmed with object recognition software that is configured to detect points on known structural features of the drogue 12 and calculate the location (e.g., position and orientation) of the drogue 12 relative to the probe 8a based on the pixel locations of those points in the acquired images As seen in FIG. 5, the video camera 42 is connected to systems onboard the receiver aircraft 4 by a power/signal cable 25 which is passed through the probe support pipe 6. More specifically, the video camera 42 may receive electric power from a battery onboard the receiver aircraft 4 and activation signals from computer system 62. In addition, the power/signal cable 25 carries image data from the video camera 42 to the computer system 62 for processing. The electrical conductors 40a and 40b also pass through the probe support pipe 6.

In accordance with the embodiment depicted in FIG. 5, the probe 8a is usually surrounded by a retractable sheath 44 which protects the probe 8a against damage. At the time when the donor aircraft 2 deploys the drogue 12, the retractable sheath 44 may be retracted to expose the probe 8a. The exposed probe 8a may then be inserted in the drogue 12.

In accordance with some embodiments, one or both aircraft may be unmanned. In alternative embodiments, either or both aircraft may be rotorcraft or lighter-than-air vehicles. In accordance with a preferred embodiment, the receiver aircraft 4 is a battery-powered unmanned aerial vehicle (UAV) having an electric motor-driven propeller.

Figure 6:
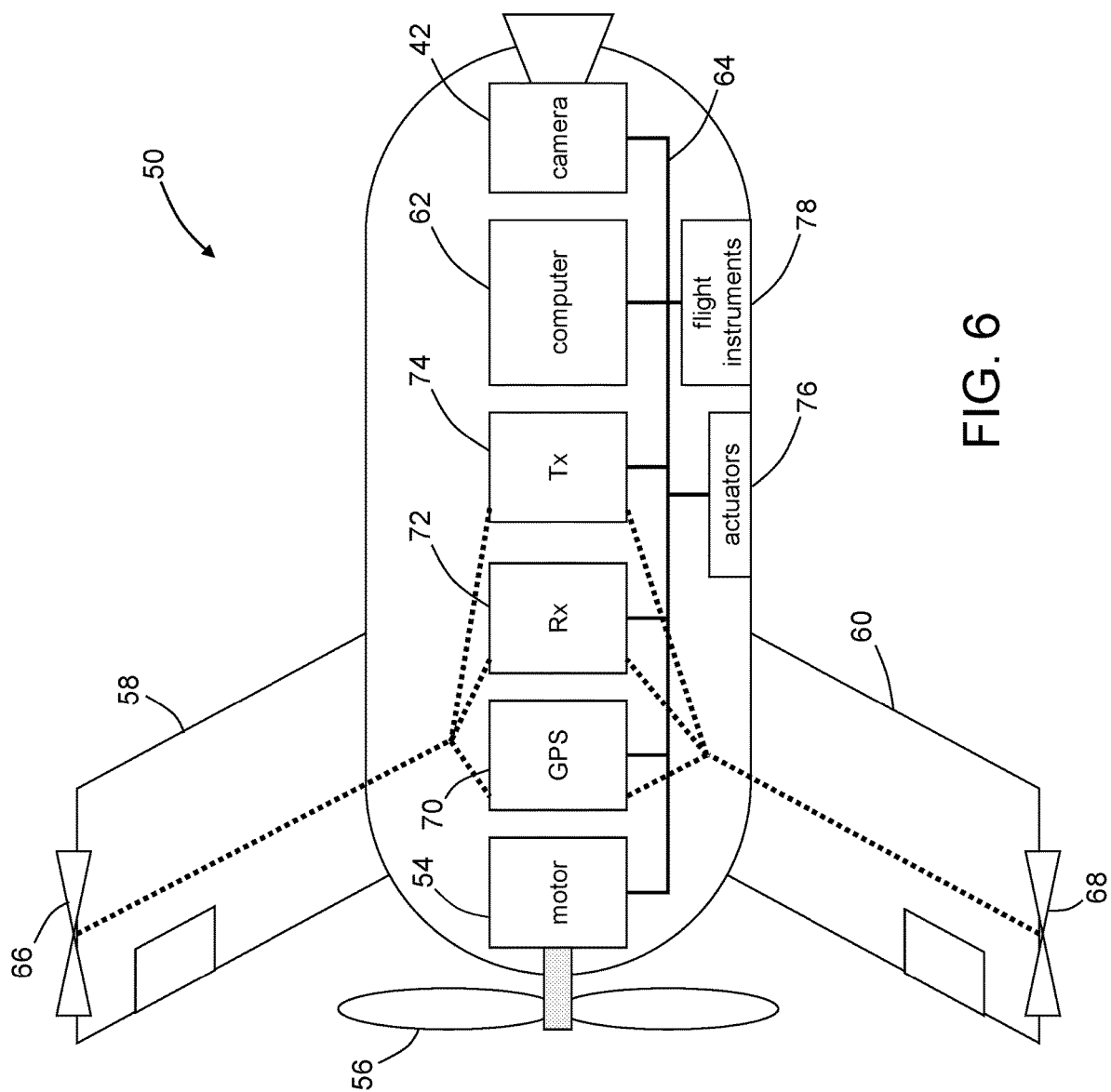
FIG. 6 is a block diagram identifying some components of a typical unmanned aerial vehicle.

FIG. 6 shows the layout of major subsystems of a battery-powered UAV 50 of a type which may employ the battery recharging system disclosed herein. UAV 50 has a camera 42 in the front end thereof and a motor 54 in the rear end thereof. The motor 54 drives rotation of a propeller 56. All subsystems communicate with an onboard computer system 62 via one or more data buses 64. The UAV 50 depicted in FIG. 6 has two antennas 66 and 68 respectively mounted at the tips of wings 58 and 60. Each antenna connects to a GPS receiver 70, a regular radio receiver (Rx) 72, and a radio transmitter (Tx) 74. The UAV 50 further comprises actuators 76 and flight instruments 78 which also communicate with computer system 62 via the one or more data buses 64. Although not shown in FIG. 6, the UAV 50 further includes one or more batteries and a battery charger.

The computer system 62 is configured for controlling the flight path and maneuvering of the UAV 50. More specifically, the computer system 62 may include a flight control computer (not shown in FIG. 6) that is configured to control actuators 76 as a function of GPS data generated by the GPS receiver 70, control commands received by the radio receiver 72, and flight plan information stored a non-transitory tangible computer-readable storage medium. In addition, the computer system 62 may include an image data processor (not shown in FIG. 6) that is configured with object recognition software for identifying and locating objects in the field of view of the video camera 42.

In accordance with one embodiment, the UAV 50 depicted in FIG. 6 is modified to include a probe 8a of the type depicted in FIG. 5, with the video camera 42 embedded in the probe 8a. The probe 8a may then be used to receive electric power from a donor aircraft 2 during flight of the UAV 50. That electric power is then used to recharge the batteries onboard the UAV 50.

FIG. 7 is a diagram identifying some components of a system for recharging a battery 86 onboard a receiver aircraft 4 during flight in accordance with one embodiment. This system includes: a power supply 94 onboard a donor aircraft 2; a pair of electrical conductors 33a and 33b incorporated in a power cable (not shown in FIG. 7, but see power cable 10 in FIG. 1) that is deployed by the donor aircraft 2; a pair of electrical contacts 28 incorporated in a drogue 12 attached to a trailing end of the power cable 10; a pair of electrical contacts 36 incorporated in a probe 8 mounted to the fuselage 5 of a receiver aircraft 4 and in contact with electrical contacts 28 when the probe 8 is fully seated in the drogue 12; a pair of electrical conductors 40a and 40b incorporated in the probe 8 and probe support pipe 6; and a pair of junctions 96 and 98 respectively disposed at the ends of electrical conductors 40a and 40b. This arrangement allows electric power from the power supply 94 to be transferred to the junctions 96 and 98 by way of electrical conductors 33a and 33b, electrical contacts 28 and 36, and electrical conductors 40a and 40b.

In accordance with the proposed implementation partly depicted in FIG. 7, the power supply 94 is an AC power supply. The junctions 96 and 98 onboard the receiver aircraft 4 are electrically coupled to an electromagnet 80 which is incorporated in the probe 8 in a position such that the electromagnet 80 will confront ferromagnetic material incorporated in the drogue 12 (e.g., stop surface 14d seen in FIG. 3 may be made of ferromagnetic material) when the probe 8 and drogue 12 are fully engaged. When the electromagnet 80 receives alternating current from the power supply 94, the electromagnet generates a magnetic force that attracts the ferromagnetic material in the drogue 12, thereby securely holding the probe 8 stationary inside the drogue 12. The electromagnet 80 may be substituted for the above-described clamping mechanism for locking the probe 8 in place when the electrical connection has been established. In an alternative embodiment, the drogue 12 may include an electromagnet that confronts ferromagnetic material incorporated in the probe 8.

In one proposed implementation, the electromagnet 80 is an electro-permanent magnet. Electro-permanent magnets are solid-state devices that have zero static power consumption (like permanent magnets), but can be switched on and off like electromagnets. The power only needs to be applied for a brief moment to toggle the state to either on or off, which makes it more useful for applications where overall power usage is preferably low. The use of electro-permanent magnets also has the benefit that, if power is lost, the coupling is still active.

The junctions 96 and 98 onboard the receiver aircraft 4 are also electrically coupled to a rectifier 82 of a battery charging system. The rectifier 82 converts alternating current from the power supply 94 into direct current. The battery charging system further includes: a smoothing capacitor 84 that is connected to the rectifier 82; a battery charger 18 that is connected in parallel with the smoothing capacitor 26; and a battery 86 having a positive terminal 88 and a negative terminal 90 connected to the battery charger 18. The battery charger 18 is configured to charge the battery 86 using direct current from the rectifier 82. In accordance with alternative embodiments, the power supply 94 may be a DC power supply, in which case the rectifier 82 and smoothing capacitor 84 would not be included.

In addition, the battery recharging system onboard the receiver aircraft 4 includes a battery monitoring and control system 92 ("BMCS 92" in FIG. 7). The battery monitoring and control system 92 regulates the flow of current into and out of various cells within the battery 86 to avoid overcharging, overheating, cell imbalance, and other issues. More specifically, the battery monitoring and control system 92 includes a voltage regulator to avoid overcharging the battery 86, a current limiter to ensure that charging does not occur too rapidly, and temperature sensors which indicate when charging should cease because the battery 86 is overheating. After the battery 86 has been recharged, it can be used to provide DC electric power to a load.

Figure 8:
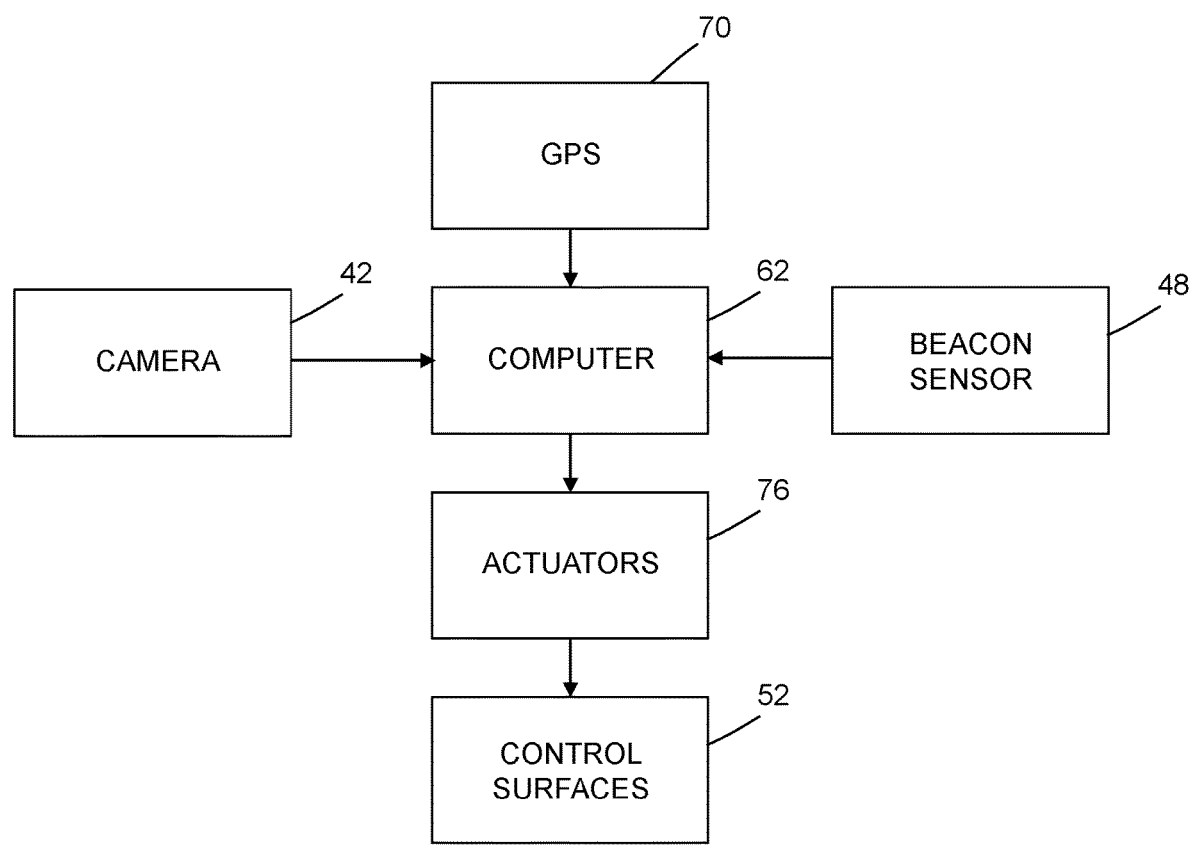
FIG. 8 is a diagram identifying some components of a navigation system onboard a receiver aircraft in accordance with one embodiment.

FIG. 8 is a diagram identifying some components of a navigation system onboard a receiver aircraft 4 in accordance with one embodiment. The navigation system is configured to control the flight of the receiver aircraft 4 to bring the receiver aircraft 4 into proximity with the donor aircraft 2 and then maneuver the receiver aircraft 4 to cause the probe 8 and drogue 12 to engage. The navigation system includes a computer system 62, a video camera 42, a beacon sensor 48 and a GPS receiver 70. The computer system 62 may include a flight control computer that receives image data from video camera 42, beacon signal data from beacon sensor 48, and GPS data from the GPS receiver 70. The flight control computer may be configured to send control signals to a multiplicity of actuators 76 which control that positions of various control surfaces 52 (e.g., ailerons, elevators, rudder, etc.) of the receiver aircraft 4.

The GPS receiver 70 receives GPS signals for continuously determining the global coordinate position of the receiver aircraft 4. Position signals representing the position coordinates of the receiver aircraft 4 are broadcast by a transmitter (e.g., radio transmitter 74 seen in FIG. 6) that is onboard the receiver aircraft 4. In addition, position signals representing the position coordinates of a rendezvous location are broadcast by the donor aircraft 2 or a ground station (not shown) and received by a receiver (e.g., radio receiver 72 seen in FIG. 6) that is onboard the receiver aircraft 4. The pilot or autopilot of the receiver aircraft 4 then uses this information to fly the receiver aircraft 4 toward the rendezvous location. Concurrently, the donor aircraft 2 also flies toward the rendezvous location. When the aircraft are in proximity to each other, the drogue 12 is deployed from the donor aircraft 2.

In accordance with one embodiment, the receiver aircraft 4 includes complementary maneuver guidance systems: a beaconing system that allows the computer system 62 onboard the receiver aircraft 4 to trace the path of the donor aircraft 2 (or the path of the drogue 12 if the beacon 106 is mounted to the drogue 12) and object recognition software that allows the computer system 62 to identify and locate the drogue 12 by processing the images acquired by the video camera 42. Any known object recognition technique may be used, such as edge detection or feature extraction.

The donor aircraft 2 includes a beacon (see beacon 106 in FIG. 9) that broadcasts beacon signals which are detected by the beacon sensor 48 onboard the receiver aircraft 4. The beacon 106 is preferably mounted on the tail of the donor aircraft 2; the beacon sensor 48 is preferably mounted on the nose of the receiver aircraft 4. The computer system 102 (see FIG. 9) onboard the donor aircraft 2 is configured to encode digital information in the beacon signal. The beacon signal is directed generally rearward by the beacon 106. The beacon sensor 48 senses the beacon signal from the beacon 106. The computer system 62 onboard the receiver aircraft 4 is configured to decode the digital information in the beacon signal.

Figure 9:
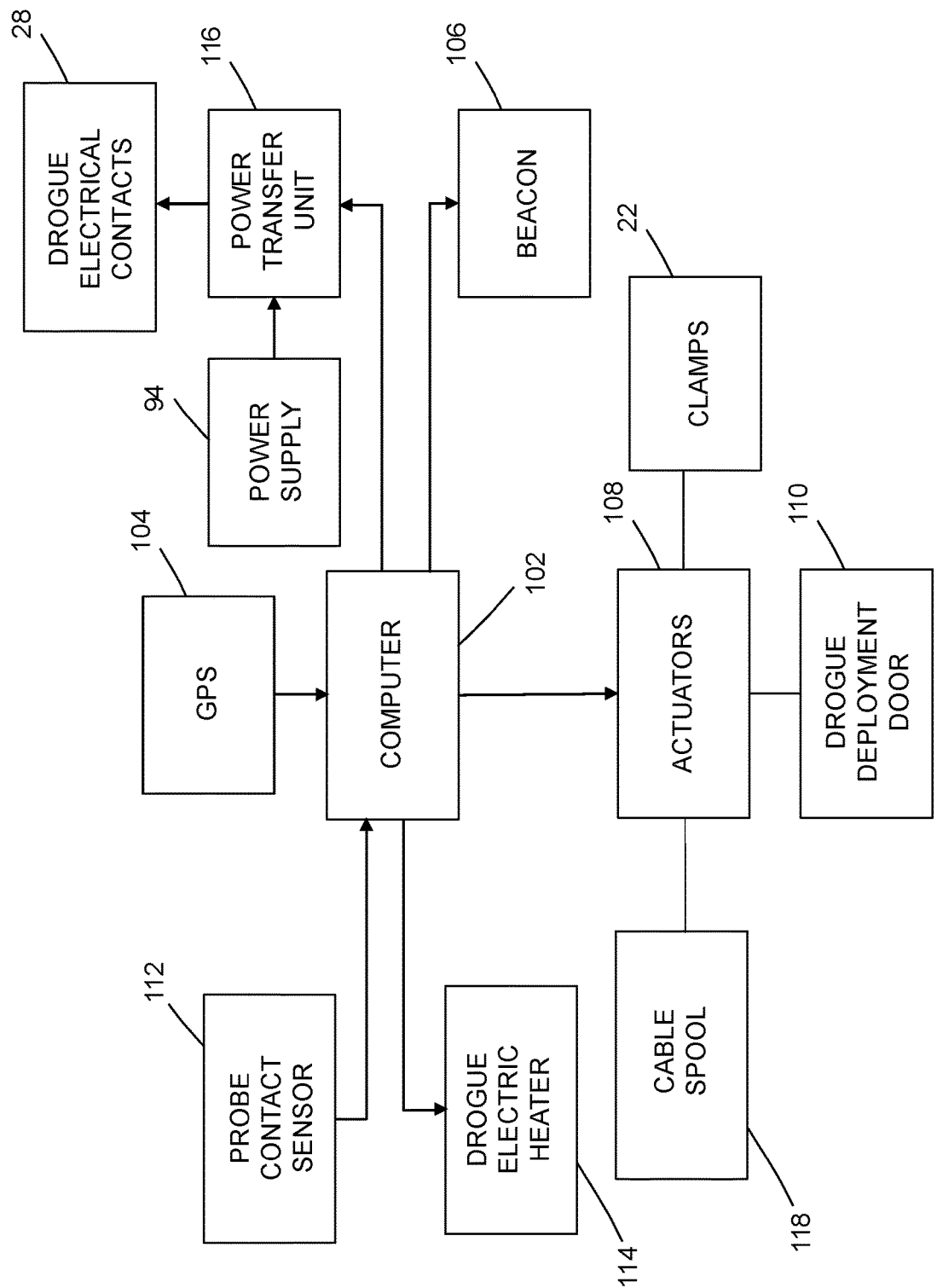
FIG. 9 is a diagram identifying some components of an electric power transfer system onboard a donor aircraft in accordance with one embodiment.

In accordance with the embodiment shown in FIGS. 8 and 9, the beacon 106 transmits data to beacon sensor 48, such as the identity, position, speed and heading of the donor aircraft 2. The beacon 106 may operate in the optical, infrared, or radiofrequency (RF) spectrum, or a combination of these. A combination may ensure that the beacon 106 and beacon sensor 48 can operate at night, in adverse weather (including fog) and in the presence of smoke, dust and other obscurants. In accordance with one proposed implementation, the beacon 106 provides a narrow-band optical or RF source and the beacon sensor 48 comprises a filter that filters the received signals to that narrow band, making the beacon sensor 48 immune to optical or electromagnetic interference. The beacon 106 may be a laser that emits a conical beam encoded with information.

As the receiving and donor aircraft communicate, the pilots or autopilots control the respective speeds and headings of the two aircraft until the receiver aircraft 4 reaches a position where the probe 8 is behind and separated from the drogue 12. The pilot or autopilot onboard the receiver aircraft 4 then maneuvers the receiver aircraft 4 to bring the probe 8 into proper position for engaging the drogue 12. Such maneuvering can be achieved using object recognition software.

In one proposed implementation, collection of information may be performed using image capture techniques, and object recognition technologies may be used to identify features (e.g., a pattern of optical targets or labels attached to the drogue 12 or other characteristic features of the drogue structure) in the field of view of the video camera 42. There are a plurality of features in a captured image that can be extracted to provide a feature description of the drogue 12. Such feature descriptors for an image can then be used to identify and locate the drogue 12 in an image. An object recognition algorithm may be used to extract feature descriptors and match the extracted features to recognize the drogue 12. The computer system 62 onboard the receiver aircraft 4 may be configured to continuously calculate the location of probe 8 relative to drogue 12 based on the image data acquired by the video camera 42 and then control the flight of the receiver aircraft 4 to continuously reduce the deviation of the location of the probe 8 relative to the drogue 12 from a target relative location corresponding to full seating of probe 8 inside drogue 12.

FIG. 9 is a diagram identifying some components of an electric power transfer system onboard the donor aircraft 2 in accordance with one embodiment. The donor aircraft 2 is equipped with a computer system 102 that may include one or more computers or processors, such as a flight control computer, an image processor and a computer for controlling various mechanical, electro-optical, electrical and electro-mechanical devices.

In addition, the donor aircraft 2 includes a GPS receiver 104, a beacon 106, a power supply 94, a power transfer unit 116, a drogue deployment door 110, and a cable spool 118. Other devices identified in FIG. 9 are components incorporated in the drogue 12, including clamps 22, drogue electrical contacts 28, a probe contact sensor 112, and a drogue electric heater 114. The probe contact sensor 112 is configured to output an electrical signal when the electrical contacts of the probe 8 and drogue 12 are in contact, as previously described. The drogue electric heater 114 may be used to avoid icing, which could interfere with the electrical connection via physical contacts. Optionally an electric heater may be included in the probe 8.

As previously described, the computer system 102 receives GPS data from a GPS receiver 104 and sends electrical beacon signals to a beacon 106. The beacon converts the electrical beacon signals into radio-frequency beacon signals which are broadcast rearwardly from the tail of the donor aircraft 2.

In the example depicted in FIG. 9, the computer system 102 is further configured to perform the following operations: (a) send an activation signal to one of a plurality of actuators 108 to actuate opening of a drogue deployment door 110 in anticipation of drogue deployment; (b) send an activation signal to another of the plurality of actuators 108 to cause a cable spool 118 to unwind the power cable 10 and thereby deploy the drogue 12; and (c) send an activation signal to the drogue electric heater 114 for heating the drogue electrical contacts 28. In addition, the computer system 102 is configured to send an activation signal to yet another of the plurality of actuators 108 to cause the clamps 22 to engage the groove 20 in the probe 8 and thereby lock the probe 8 inside the drogue 12 in response to receipt of the signal from the probe contact sensor 112 indicating that the probe and drogue electrical contacts are in a state of electrical connection by contact.

When the probe 8 and drogue 12 are fully engaged and electrically coupled, the computer system 102 is further configured to output an activation signal to the power transfer unit 116. In response to that activation signal, switches in the power transfer unit 116 are closed, thereby establishing an electrical connection between the power supply 94 and the drogue electrical contacts 28. The power supply 94 is then able to provide electric power to the receiver aircraft 4 for recharging the receiver aircraft's batteries. The power supply 94 has a power capacity which substantially exceeds the power needed by onboard systems.

In accordance with alternative embodiments, the battery may be a battery, a regenerable fuel-cell, a super-capacitor, a superconducting inductor, or some other device for receiving and storing electrical energy. The probe may be fixed, retractable/extendable in flight to reduce drag, or detachable (on the ground) to reduce drag and weight. Instead of having a mechanism to deploy/stow a power cable 10 during flight, the power cable may be fixed or detachable on the ground. The power cable 10 may be attached to or extended from the aft portion of the fuselage, the empennage, or one or more wing pods of the donor aircraft 2. Instead of a clamping mechanism, either the probe 8 or the drogue 12 may be equipped with a suction device to help guide and hold the probe 8 inside the drogue 12.

In accordance with a further alternative embodiment, the receiver aircraft 4 is equipped with a hook that may be latched onto a trapeze bar that depends from the donor aircraft 2. The trapeze bar and hook include respective sets of electrical contacts that enable electric power to be transferred from the donor aircraft 2 to the receiver aircraft 4.

Figure 11:
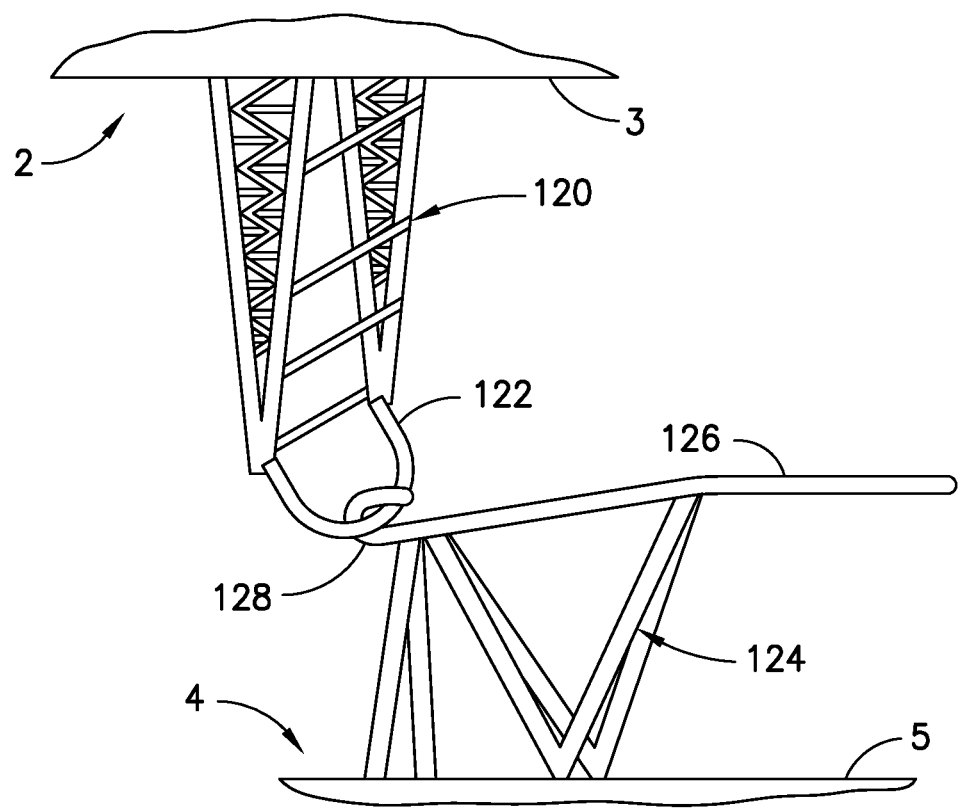
FIG. 11 is a diagram representing a view of a hook and trapeze mechanism for coupling one aircraft to another aircraft during flight.

FIG. 11 is a diagram representing a view of a hook and trapeze mechanism for coupling a receiver aircraft 4 to a donor aircraft 2 during flight in accordance with one alternative embodiment. The donor aircraft 2 includes a fuselage 3, a truss structure 120 attached to and extending downward from the fuselage 3, and a trapeze bar 122 attached to (e.g., by fasteners) or joined to (e.g., by welding) the distal end of the truss structure 120. Alternatively, the truss structure 120 may be attached to support structure inside the fuselage 3, such as floor beams.

Still referring to FIG. 11, the receiver aircraft 4 includes a fuselage 5, a truss structure 124 attached to and extending upward from the fuselage 5, a guide bar 126 attached to (e.g., by fasteners) or joined to (e.g., by welding) to the truss structure 124, and a hook 128 integrally formed with the trailing end of the guide bar 126. The hook 128 is configured to hook onto a central horizontal section of the trapeze bar 122, as shown in FIG. 11. In this mechanically coupled state, the trapeze bar 122 and hook 128 are also electrically coupled to enable the transfer of electric power from the donor aircraft 2 to the receiver aircraft 4.

In the embodiment shown in FIG. 11, the truss structure 124 projects well above the fuselage 5 of the receiver aircraft 4, while the guide bar 126 also protects the propeller from the trapeze bar 122 in cases wherein the receiver aircraft 4 is propeller driven. In alternative embodiments, the hook 128 may be mounted closer to, or even directly on, the aircraft structure. With propellers farther from the hook 128 (e.g., twin engines or pusher), no protective bar is needed. The hook 128 may be on the bottom or a side rather than on top of the receiver aircraft 4, and the trapeze bar 122 may be on a top or side rather than a bottom of the donor aircraft 2. Optionally, the truss structure 120 is retractable into the interior of the fuselage 3 of the donor aircraft 2. In alternative embodiments, the truss structure 120 may be eliminated and the trapeze bar 122 may be mounted directly to the donor aircraft structure.

Figure 12:
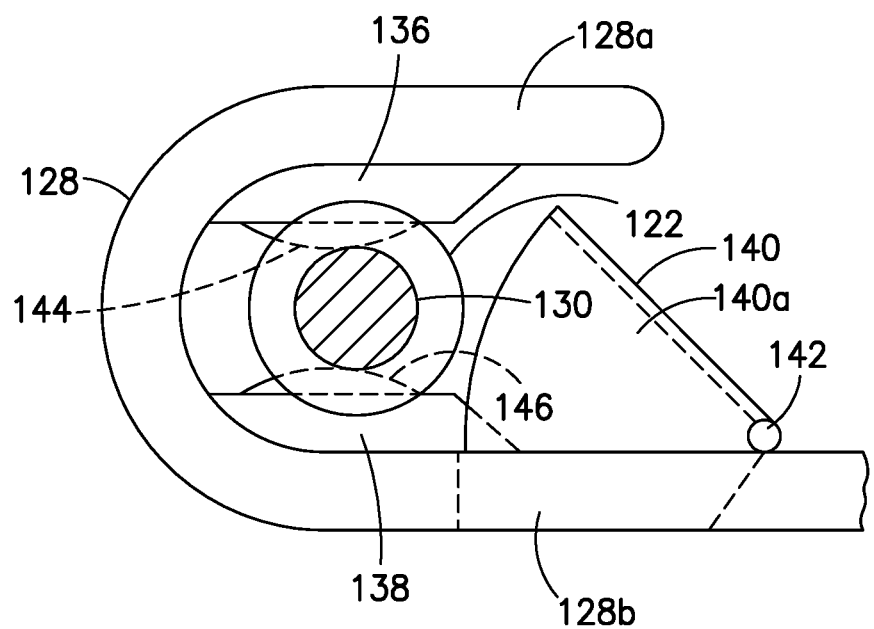
FIG. 12 is a diagram representing an end view of a trapeze bar having a hook latched thereon in accordance with one embodiment.

FIG. 12 is a diagram representing an end view of a trapeze bar 122 having a hook 128 latched thereon in accordance with one embodiment. The hook 128 includes an upper guide 136 projecting from an upper portion 128a of the hook 128 and a lower guide 138 projecting from a lower portion 128b of the hook 128. The upper and lower guides 136 and 138 guide the hook 128 into lateral alignment with the trapeze bar 122 as the trapeze bar 122 enters hook 128.

The hook and trapeze mechanism partly depicted in FIG. 12 further includes a spring-loaded and wedge-shaped pivotable latch 140 (the spring is not shown) that is rotatably coupled to a pivot axle 142. The opposing ends of the pivot axle 142 are affixed to a lower portion of the hook 128. The latch 140 is rotatable between closed and open positions. The closed position of latch 140 is shown in FIG. 12. When the trapeze bar 122 enters the hook 128 and passes the latch 140, the latch 140 closes. The curved edges of the latch sidewalls hold the trapeze bar 122 between the upper and lower guides 136 and 138, thereby maintaining electrical coupling between the electrical contacts on the trapeze bar 122 and the hook 128 during electric power transfer.

Figure 13:
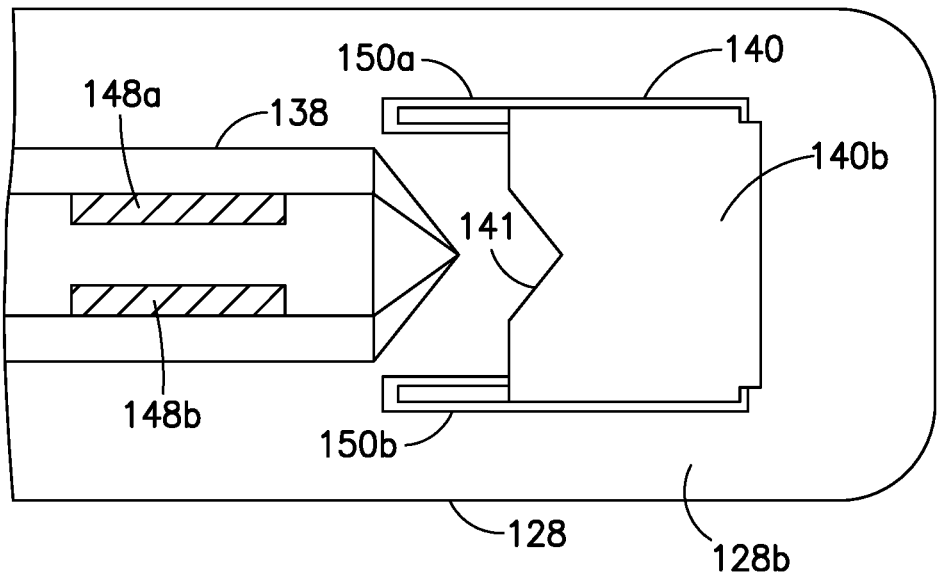
FIG. 13 is a diagram representing a top view of the lower portion of the hook partly depicted in FIG. 12.

As best seen in FIG. 13, the lower portion of the hook 128 has two mutually parallel slots 150a and 150b formed therein for receiving respective sidewalls (only sidewall 140a is visible in FIG. 12) of latch 140 when the latch 140 is pushed by the incoming trapeze bar 122 from the closed position to the open position. The sidewall are connected to and project in parallel from the side edges of a cross wall 140b. The cross wall 140b of the latch 140 is formed with a triangular recess 141 designed to avoid interference of the latch 140 with the lower guide 138 when the latch 140 is opened, e.g., when the latch 140 is rotated downward until the cross wall 140b of the latch 140 contacts the lower portion 128a of hook 128.

Referring again to FIG. 12, the upper guide 136 supports an upper spring-loaded contact support reed 144, which is a flexible reed made of electrically insulating material and having a pair of electrical contacts attached thereto. The lower guide 138 supports a lower spring-loaded contact support reed 146, which is a flexible reed made of electrically insulating material and having a pair of electrical contacts attached thereto. In accordance with an alternative embodiment, it may be sufficient that only one of the two contact support reeds is spring-loaded.

FIG. 13 is a top view of the lower portion of the hook 128 and shows a pair of electrical contacts 148a and 148b disposed on the lower guide 138. The corresponding pair of electrical contacts on the upper guide 136 are not shown in the drawings. In accordance with an alternative embodiment, a single guide may be sufficient, but using a pair of guides distributes stress better.

Figure 14:
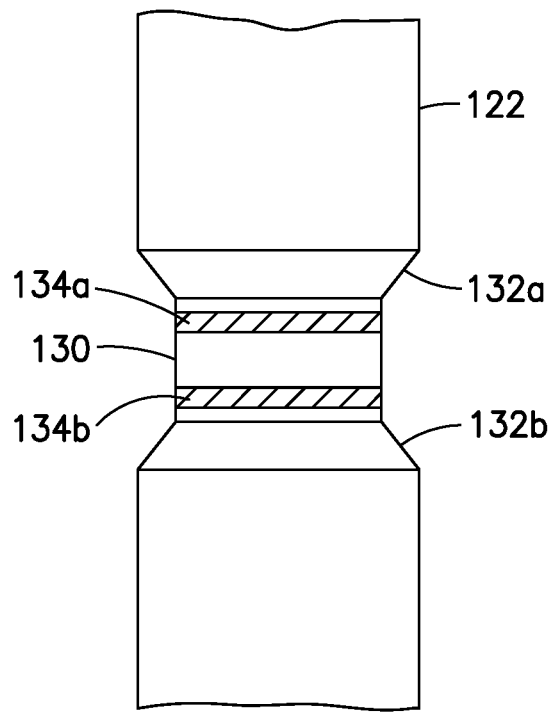
FIG. 14 is a diagram representing a view of a trapeze bar having a narrow section equipped with electrical contacts for transferring power to electrical contacts on the hook partly depicted in FIGS. 11 and 12.

As best seen in FIG. 14, the trapeze bar 122 has a central narrow section 130 having a diameter less than the diameter of the adjacent sections of the trapeze bar 122 on opposite sides of central narrow section 130. The central narrow section 130 is equipped with a pair of electrical contacts 134a and 134b for transferring power from the donor aircraft 2 to the receiver aircraft 4 by way of electrical contacts 148a and 148b on the hook 128. In accordance with the proposed implementation partly depicted in FIGS. 13 and 14, the electrical contacts 148a and 148b (see FIG. 13) incorporated in the hook 128 are made of electrically conductive material formed into bar-shaped strips, whereas the electrical contacts 134a and 134b (see FIG. 14) incorporated in the trapeze bar 122 are made of electrically conductive material formed into annular bands. When the trapeze bar 122 is disposed inside the hook 128 as depicted in FIG. 12, the electrical contact 148a on the hook 128 will be in contact with the electrical contact 134a on the trapeze bar 122, while the electrical contact 148b on the hook 128 will be in contact with the electrical contact 134b on the trapeze bar 122.

During an aircraft coupling operation, the receiver aircraft 4 approaches the donor aircraft 2 and pushes the hook 128 onto the trapeze bar 122. The trapeze bar 122 forces the latch 140 out of the way and slides into the hook 128 as shown in FIG. 12. During this motion, the upper and lower guides 136 and 138 (fitting within the central narrow section 130 of the trapeze bar 122) center the trapeze bar 122 laterally in the hook 128. More specifically, each guide has a pair of angled surface which respectively bear against a pair of conical surfaces 132a, 132b disposed on opposite sides of the central narrow section 130 of the trapeze bar 122. When the trapeze bar 122 passes the latch 140, the latch closes, securing the trapeze bar 122 in the hook 128. Later during the transfer of electric power, the electrical contacts allow current to flow from the donor aircraft 2 to the receiver aircraft 4. To release, an actuator (see latch release actuator 154 in FIG. 15) on the receiver aircraft 4 retracts the latch 140. The two aircraft can then separate.

Figure 15:
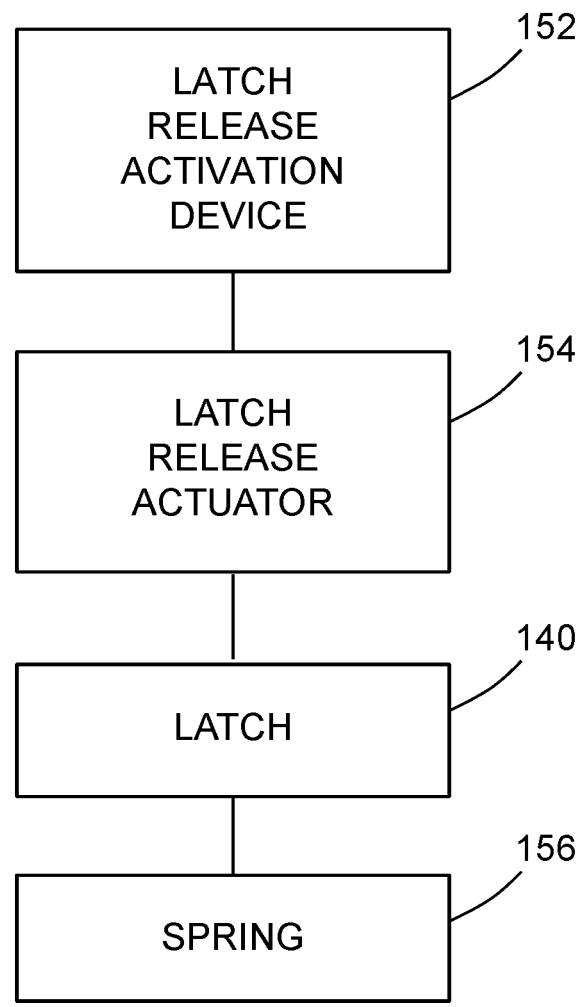
FIG. 15 is a block diagram identifying some components of a system for releasing a latch that is incorporated in the hook partly depicted in FIGS. 11 and 12.

FIG. 15 is a block diagram identifying some components of a system for releasing the latch 140 that is incorporated in the hook 128 partly depicted in FIGS. 12 and 13. The system includes a latch release activation device 152 (e.g., a specially programmed computer or a pilot-operable mechanical input device such as a lever or button) that outputs an electrical actuator control signal in response to a determination that the electric power transfer operation has been completed and the aircraft should disengage. The system further includes a latch release actuator 154 which may be activated in response to receipt of an electrical actuator control signal from the latch release activation device 152. The latch release actuator 154, when activated, applies a force on the latch 140 that overcomes a spring force being exerted on the latch 140 by a spring 156, thereby releasing the latch 140. The spring 156 which is configured to urge the latch 140 to rotate from the open position to the closed position. The latch release actuator 154 forces the spring-loaded latch 140 to rotate from the closed position to the open position.

In accordance with the embodiment depicted in FIGS. 11-15, the donor aircraft 2 includes a fuselage 3, a trapeze bar 122 disposed outside the fuselage 3, a power supply 94, a power transfer unit 116 configured to transfer electric power from the power supply 94 in a power transfer mode, and electrical conductors (not shown) electrically coupled to the power transfer unit 116, wherein the trapeze bar 122 comprises first and second electrical contacts 134a and 134b which are electrically coupled to the electrical conductors and disposed on an external surface of a central narrow section 130 of the trapeze bar 122.

In cases where the receiver aircraft is electrically propelled, the wired battery charging methodologies disclosed herein extend the range and duration of flight for receiver aircraft (e.g., unmanned aerial vehicles). In addition, the technology disclosed herein reduces the battery size needed to power the electrically propelled aircraft, thereby reducing cost and increasing flight duration and efficiency as a result of reduced weight. Furthermore, this technology enables long-distance missions that are otherwise difficult for electrically propelled aircraft without a form of aerial recharging.

While systems and methods for transferring electric power to an aircraft during flight have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" comprises a single processing or computing device (e.g., a computer or a processor) or multiple processing or computing devices that communicate via wireline or wireless connections. Such processing or computing devices typically include one or more of the following: a processor, a microprocessor, a controller, a central processing unit, a reduced instruction set computer processor, an application-specific integrated circuit, a programmable logic circuit, a field-programmable gated array, a digital signal processor, and/or any other circuit or processing device capable of executing the data processing functions described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A system for transferring electric power, comprising:
a receiver aircraft comprising a first fuselage and a first coupling device externally mounted to the first fuselage, wherein the first coupling device comprises first and second electrical contacts and first and second electrical conductors respectively connected to the first and second electrical contacts; and
a donor aircraft comprising a second fuselage and a second coupling device positioned aft of the second fuselage, wherein the second coupling device comprises third and fourth electrical contacts and third and fourth electrical conductors respectively connected to the third and fourth electrical contacts,
wherein the first and second electrical contacts are respectively in contact with the third and fourth electrical contacts when the first and second coupling devices are coupled together;
wherein one of the first and second coupling devices has an annular groove and the other of the first and second coupling devices comprises a piston that fits into the annular groove for locking the first and second coupling devices together, a crank connected to the piston, and a motor having an output shaft connected to the crank; and
wherein the piston is displaced radially inward into the annular groove when the motor drives rotation of the crank.

2. The system as recited in claim 1, wherein the second coupling device comprises first and second springs for urging the third and fourth electrical contacts into contact with the first and second electrical contacts.

3. The system as recited in claim 1, wherein the first and second electrical contacts are circular bands made of electrically conductive material.

4. The system as recited in claim 1, wherein the donor aircraft further comprises a power supply and the receiver aircraft further comprises a battery and a battery charger configured to recharge the battery with electric power supplied by the power supply onboard the donor aircraft when the first and second coupling devices are coupled together.

5. The system as recited in claim 1, wherein:
the donor aircraft further comprises a beacon for transmitting a beacon signal and a first computer system configured to encode digital information in the beacon signal; and
the receiver aircraft further comprises a beacon sensor for sensing the beacon signal and a second computer system configured to decode the digital information in the beacon signal.

6. The system as recited in claim 5, wherein the first coupling device further comprises a camera and the second computer system is further configured to receive image data representing an image from the camera and then use an image recognition algorithm to extract feature descriptors and match the extracted features to recognize the image.

7. The system as recited in claim 1, wherein the first coupling device is a probe and the second coupling device is a drogue.

8. The system as recited in claim 7, wherein:
the receiver aircraft further comprises a probe support pipe attached to the first fuselage;
the probe is attached to one end of the probe support pipe; and
the first and second electrical conductors extend from the probe to another end of the probe support pipe.

9. The system as recited in claim 8, wherein:
the donor aircraft further comprises a power cable extending rearward of the second fuselage;
the drogue is attached to one end of the power cable; and
the third and fourth electrical conductors extend from the drogue to another end of the power cable.

10. The system as recited in claim 9, wherein the donor aircraft further comprises a power supply and the receiver aircraft comprises a battery charger that receives electric power from the power supply onboard the donor aircraft via the first through fourth electrical conductors when the first and second electrical contacts of the probe are respectively in contact with the third and fourth electrical contacts of the drogue.

11. A system for transferring electric power, comprising:
a receiver aircraft comprising a first fuselage and a first coupling device externally mounted to the first fuselage, wherein the first coupling device comprises first and second electrical contacts and first and second electrical conductors respectively connected to the first and second electrical contacts; and
a donor aircraft comprising a second fuselage and a second coupling device positioned aft of the second fuselage, wherein the second coupling device comprises third and fourth electrical contacts and third and fourth electrical conductors respectively connected to the third and fourth electrical contacts,
wherein the first and second electrical contacts are respectively in contact with the third and fourth electrical contacts when the first and second coupling devices are coupled together;
wherein the first coupling device comprises a hook, a pivot axle having opposing ends affixed to the hook, and a pivotable latch that is rotatably coupled to the pivot axle and spring-loaded; and
wherein the second coupling device comprises a trapeze bar configured to fit between the hook and the pivotable latch when the pivotable latch is in a closed position.

12. The system as recited in claim 1, wherein the receiver aircraft further comprises a battery charger and an electrical connection between the battery charger and the electrical contacts in the coupling device.

13. The system as recited in claim 12, wherein the first coupling device comprises a probe and the electrical contacts comprise circular bands made of electrically conductive material.

14. The system as recited in claim 1, wherein the donor aircraft further comprises a cable spool rotatably coupled to the fuselage, a power supply, and a power transfer unit configured to transfer electric power from the power supply in a power transfer mode, a power cable connected to the cable spool and electrically coupled to the power transfer unit, the second coupling device comprises a drogue attached to the power cable, the power cable comprises electrical conductors, and the drogue comprises the first and second electrical contacts which are electrically coupled to the electrical conductors of the power cable.

15. The system as recited in claim 11, wherein the donor aircraft further comprises a power supply, a power transfer unit configured to transfer electric power from the power supply in a power transfer mode, and electrical conductors electrically coupled to the power transfer unit, wherein the trapeze bar comprises the third and fourth electrical contacts which are electrically coupled to the electrical conductors and disposed on an external surface of the trapeze bar.

16. A system for transferring electric power during flight, comprising:
a receiver aircraft comprising a first fuselage, a battery, a battery charger connected to the battery, a rectifier connected to the battery charger, and a first coupling device externally mounted to the first fuselage, wherein the first coupling device comprises first and second electrical contacts and first and second electrical conductors respectively connecting the first and second electrical contacts to the rectifier; and
a donor aircraft comprising a second fuselage, a power supply, a power cable connected to the power supply, and a second coupling device external to and positioned aft of the second fuselage, wherein the second coupling device comprises third and fourth electrical contacts connected to the power supply via the power cable,
wherein the first and second electrical conductors are cups having profiles that are truncated cones;
wherein the third and fourth electrical conductors are annular bands; and
wherein the first and second electrical contacts are respectively in contact with the third and fourth electrical contacts.

17. The system as recited in claim 1, wherein:
the first and second electrical conductors are cups having profiles that are truncated cones: and
the third and fourth electrical conductors are annular bands.

18. The system as recited in claim 11, wherein:
the pivotable latch comprises sidewalls connected to and projecting in parallel from side edges of a cross wall; and
a lower portion of the hook has two mutually parallel slots formed therein for receiving the sidewalls of the pivotable latch when the pivotable latch is pushed by the trapeze bar from the closed position to an open position.

19. The system as recited in claim 18, wherein the hook comprises upper and lower guides that are configured to guide the hook into lateral alignment with the trapeze bar as the trapeze bar enters the hook.

20. The system as recited in claim 19, further comprising a spring-loaded contact support reed supported by one of the upper and lower guides and comprising a flexible reed made of electrically insulating material and having the first and second electrical contacts made of electrically conductive material formed into bar-shaped strips attached thereto.

21. The system as recited in claim 20, wherein the trapeze bar has a central narrow section having a diameter less than a diameter of adjacent sections of the trapeze bar on opposite sides of the central narrow section, the third and fourth electrical contacts being made of electrically conductive material formed into annular bands attached to the central narrow section.

* * * * *